United States Patent Office 3,012,061
Patented Dec. 5, 1961

3,012,061
PREPARING BETA-HYDROMUCONIC SEMI-NITRILE AND ESTERS THEREOF
Gioacchino Boffa, Gian Paolo Chiusoli, and Adolfo Quilico, all of Milan, Italy, assignors to Montecatini Soc. Gen. per l'Industria Mineraria e Chimica, Milan, Italy
No Drawing. Filed Feb. 3, 1959, Ser. No. 790,798
Claims priority, application Italy June 10, 1958
3 Claims. (Cl. 260—465.4)

This invention refers to the preparation of beta-hydromuconic mononitrile and esters thereof from the hydrolysis products of 1-chloro-4-cyano-butene-2, the latter being obtained by the action of hydrochloric acid in the cold in the presence of a solvent containing a hydroxyl group selected from the class comprising water, methyl alcohol, ethyl alcohol.

The transformation of chlorinated compounds of the allyl type to the related cyano compounds is a known process in the technical literature, but does not seem to have ever been used in connection with hydrolysis products of chloro-cyano-butene, still less for the special use described hereafter, we having found that the above transformation can be directly effected on hydrochloric solutions containing the above mentioned hydrolysis products of chloro-cyano-butene.

On the other hand, it should be noted that the transformation into the related cyano compounds of hydrolysis products of chloro-cyano-butene is of considerable importance in view of the wide use made by industry of the resulting compounds which, upon being hydrogenated by known methods, can easily be converted to monomers for the product known by the trade name "Nylon 6."

The transformation into cyano compounds of the hydrolysis products of chloro-cyano-butene in the manner discovered by us and described hereafter affords high yields even at room temperature.

The hydrolysis products of chloro-cyano-butene to which this method refers comprise the 5-chloro, 3-pentenoic acid amide and esters of the said acid. The hydrolysis products comprise further the 5-chloro, 3-pentenoic acid, the transformation of which into a cyano compound is, however, of smaller practical importance since its amide can be directly transformed into a cyano compound.

We have described in a prior application the method of preparing the 5-chloro, 3-pentenoic acid amide and the acid iteself.

A similar method shall now be described for preparing the 5-chloro, 3-pentenoic acid esters, starting from chloro-cyano-butene through its hydrolysis products.

The method essentially comprises the steps of dissolving chloro-cyano-butene in a suitable solvent in the presence of gaseous hydrochloric acid at temperatures ranging between 0 and 40° C. The solvent used is selected from the class comprising water, methyl alcohol, and ethyl alcohol. This solvent can be employed alone or in suitable mixtures with inert solvents.

This step is followed by transformation into the cyano compound of the hydrolysis product of the chloro-cyanobutene according to the following reaction:

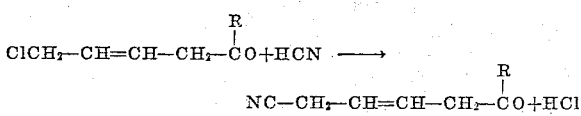

wherein R=NH$_2$; OR$_1$ and R$_1$=H; alkyl.

We have found that the transformation into the cyano compound is conveniently carried out by means of hydrocyanic acid, sodium or other cyanide at a temperature ranging between 10 and 100° C., preferably 40–90° C. in an aqueous solution containing copper(ous) chloride, copper and sodium chloride in the presence of a buffer such as calcium carbonate or magnesium carbonate. The buffer neutralizes acidity set free in the reaction thereby avoiding any hydrolysis of the esters.

The above mentioned transformation into the cyano compound may be carried out by either directly transforming the hydrolysis products contained in the hydrochloric solution without isolating them or by transforming the hydrolysis products which have previously been separated from the hydrochloric solution.

It should be noted that the possibility discovered by us of directly transforming into the cyano compound the hydrolysis products without isolating them from the reaction mixture is a feature of particular importance of the improved method. For it makes available a method which is simple to carry out and avoids separation of intermediary products, thereby affording a considerable saving of time and work.

The above described method comprises 2 steps, in the first of which the chloro-cyano-butene is dissolved in the solvent, which may be water, methyl alcohol, ethyl alcohol or a mixture of any of them with inert solvents, the solution being maintained saturated with hydrochloric acid by means of gaseous hydrogen chloride, at temperatures ranging between 0 and 40° C., and in the second step there is directly transformed into the cyano compounds the solution from the first step, or the hydrolysis products from the first step after separating or purifying them by distillation.

The details of the method include certain features in effecting the above mentioned steps. Starting from chloro-cyano-butene and hydrochloric acid and operating in an aqueous solution results in chloropentenoic acid amide. The transformation of the latter into the related cyano compound is effected by introducing into the reaction zone the amide and hydrocyanic acid at the same time. Reaction is effected in a vessel fitted with stirring means and a reflux cooler. The vessel is filled with an aqueous solution containing copper(ous) chloride and copper metal in a ratio of 1–2% to the starting product. Calcium carbonate is suspended in the aqueous solution in a quantity stoichiometrically corresponding to the total quantity of hydrochloric acid involved in the operation, e.g. to the acid quantity initially in the reactor admixed with the acid quantity set free as the reaction proceeds.

Hydrocyanic acid is introduced into the reaction mixture at such a rate as to achieve the addition within about half an hour, the reaction container being suitably cooled in order to remove the heat set free.

The above reaction chiefly yields the amide of the beta-hydromuconic mononitrile which remains in the solution. About 2 hours after completing the addition of hydrocyanic acid, the solution is heated on a water bath, and it is maintained acid by means of hydrochloric acid. This hydrochloric acid excess, which should not exceed 2% by weight of the solution, may be obtained by introducing at the start of the reaction calcium carbonate in a quantity lower than the stoichiometrically calculated quantity or by acidifying at the end of the reaction by means of the required quantity of hydrochloric acid.

The hot acid solution is conveniently cooled, thereupon extracted by means of a solvent such as ethyl ether, isopropyl ether, benzene, toluene, chloroform or methylchloroform.

Upon removing the extracting solvent the beta-hydromuconic mononitrile results, which distils at 178–185° C. at 15 mm. When starting from methyl or ethyl esters of beta-hydromuconic mononitrile, the transformation into the cyano compound may be carried out by adding a solution containing the ester together with hydrocyanic acid dropwise into the liquid containing the catalyst and calcium carbonate, as the latter is stirred, operating in the manner described in connection with the transformation of the chloro-pentenoic acid amide. According to a further modification, the raw chloroester may be separated by pouring the alcoholic solution into water, extracting by one of the extraction solvents mentioned above, such as benzene, then conveniently removing the said solvent. The chloroester is thereupon transformed into the cyano compound by dissolving therein a stoichiometric or an excess quantity of hydrocyanic acid, then adding said solution dropwise into the liquid mixture containing the catalyst and calcium carbonate. This method, which is particularly suitable when chloroester is prepared in admixture with benzene or other inert solvent which slightly dissolves hydrochloric acid, provides high cyanoester yields without any appreciable hydrochloric acid loss in the solution.

The boiling points of the methyl and ethyl esters of chloro-pentenoic acid and beta-hydromuconic mononitrile are indicated below:

Chloro-pentenoic acid methyl ester
   B.P. 80–85° C. at 12 mm.
Chloro-pentenoic acid ethyl ester
   B.P. 90–95° C. at 12 mm.
Beta-hydromuconic mononitrile methyl ester
   B.P. 135–140° C. at 15 mm.
Beta-hydromuconic mononitrile ethyl ester
   B.P. 145–150° C. at 15 mm.

The methyl ester of beta-hydromuconic mononitrile is of particular importance on account of the ease with which it can be converted by hydrogenation to the methyl ester of epsilon-aminocaproic acid, which, as is well known, is easily transformed into the cyclic-compound epsilon-caprolactam. The examples given hereafter are merely given by way of example and should not be understood to limit the scope of the invention in any manner.

*Example 1*

21 g. chlorocyano butene and 50 ccm. concentrated HCl are treated for half an hour by means of gaseous hydrochloric acid at 20° C., and neutralized by means of sodium bicarbonate. The product is extracted with ether obtaining 20 g. chloro-pentenoic amide. 20 g. chloro-pentenoic amide together with 50 ccm. water are added with 7 ccm. hydrocyanic acid into a flask fitted with a mechanical stirrer and kept at a temperature of 20° C. The flask contains 100 ccm. $H_2O$, 15 g. calcium carbonate, 0.3 g. copper(ous) chloride, 3 g. sodium chloride and 0.15 g. copper metal. The whole is stirred for 2 hours, then acidified by means of hydrochloric acid and refluxed for 3 hours, the solution being maintained at a hydrochloric acid content below 2%. On extracting by means of ether 13.5 g. beta-hydromuconic mononitrile is obtained, which distils at 178–185° C./15 mm. Hg.

*Example 2*

20 g. chlorocyano-butene is treated for half an hour with 50 ccm. concentrated hydrochloric acid in a stream of gaseous hydrochloric acid at 20° C. The solution is poured as such together with 7 ccm. hydrocyanic acid into a flask fitted with a stirrer, the said flask containing 100 ccm. $H_2O$, 70 g. calcium carbonate, 0.3 g. copper(ous) chloride, 3 g. sodium chloride and 0.18 g. powdered copper.

The temperature is maintained at 20° C. for 2 hours. The whole is acidified by means of hydrochloric acid and refluxed for 3 hours, the hydrochloric content of the solution being kept below 2%. On extracting by means of ether, 17 g. beta-hydromuconic mononitrile is obtained (yield 78.7% of theory).

*Example 3*

40 g. chlorocyano-butene, 60 ccm. methyl alcohol and 8 ccm. water are treated for 3½ hours by means of gaseous HCl to saturation, maintaining the temeprature in the range of 10–15° C.

The solution is still stirred for 2 hours, then the solution is dripped into 500 ccm. $H_2O$ maintaining the temperature at 5°. The temperature is then raised to 20° and extraction is carried out by means of ether or benzene. On evaporating the solvent 44.6 g. ester is obtained (yield 86.7%). 38.8 g. of this ester is admixed with 14 ccm. HCN and added dropwise in the course of about 1 hour at 90° to the following mixture:

| | | |
|---|---|---|
| $H_2O$ | ccm. | 65 |
| NaCl | g. | 1.3 |
| Cu | g. | 0.06 |
| CuCl | g. | 0.12 |
| HCl conc. | ccm. | 0.25 |
| $CaCO_3$ | g. | 15 |

On distilling, 3.9 g. unreacted chloroester and 30 g. cyano-ester (yield 92%) are obtained. The yield based on the chlorocyano-butene introduced is therefore 79.8% of theory.

*Example 4*

40 g. chlorocyano-butene, and 30 ccm. methyl alcohol are treated at 10–15° for about 2 hours by means of 32 g. gaseous HCl. The mixture is allowed to stand over night. The product is gradually added to 200 ccm. water, then extracted by means of ether or benzene. On evaporating the solvent 45.1 g. ester (88% yield) is obtained.

38.8 g. of this ester is admixed with 14 ccm. HCN and added dropwise at 90° in the course of about 1 hour to the following mixture:

| | | |
|---|---|---|
| $H_2O$ | ccm. | 65 |
| NaCl | g. | 1.3 |
| Cu | g. | 0.06 |
| CuCl | g. | 0.12 |
| HCl conc. | ccm. | 0.25 |
| $CaCO_3$ | g. | 15 |

On distilling 3.9 g. unreacted chloro-ester and 30 g. cyano-ester (92% yield) are obtained. The yield based on the chlorocyano-butene introduced is 91% of theory.

*Example 5*

Gaseous hydrochloric acid is caused to flow for ½ hour through a solution kept at 15° containing 20 g. chlorocyanobutene, 30 ccm. methyl alcohol and 4 ccm. $H_2O$. The solution prepared as above together with 7 ccm. hydrocyanic acid are poured in the course of 30 minutes into a 500 ccm. flask containing 100 cc. $H_2O$, 3 g. NaCl, 0.15 g. Cu, 0.3 g. CuCl, 40 g. $CaCO_3$, while stirring for 3 hours at 20° C. On extracting by means of benzene 18 g. cyano-ester (74.5% yield) is obtained.

*Example 6*

40 g. chlorocyano-butene, 20 ccm. methyl alcohol and 100 ccm. benzene are treated for 3 hours by means of gaseous HCl at 10–15° to saturation. About 30 g. HCl is absorbed. Stirring is continued for 2 hours more. The product is poured into 125 ccm. water, the benzene layer being removed by separation. The solvent is distilled leaving 45.6 g. ester, the yield being 88.8% of theory. The transformation into the cyano compound as described in Example 1 leads to a total cyano-ester yield calculated on the starting material i.e. chlorocyano-butene of 81.5%.

*Example 7*

A flow of gaseous hydrochloric acid is passed for 1 hour through a solution of 20 g. chlorocyano-butene in 30 ccm. ethyl alcohol and 4 ccm. $H_2O$. The resulting solution is poured together with 8 ccm. hydrocyanic acid in 50 ccm. ethyl alcohol and for ½ hour into a flask kept at 20° C. containing 40 g. calcium carbonate, 0.3 g. copper(ous) chloride, 0.15 g. powdered copper, 3 g. sodium chloride and 100 ccm. $H_2O$. The whole is stirred for 3 hours, diluted with water and extracted with benzene. The result is 9 g. ethyl ester of beta-hydromuconic mononitrile.

What we claim is:

1. The process of preparing a member of the group consisting of beta-hydromuconic mononitrile and its methyl and ethyl esters which comprises adding hydrochloric acid to a solution of 1-chloro-4-cyano-butene-2 in a solvent selected from the group consisting of water, methyl alcohol and ethyl alcohol, respectively, while maintaining the solution at a temperature between 0° and 40° C. thereby to hydrolyze the chlorocyanobutene, then reacting the solution containing the hydrolyzed chlorocyanobutene thus obtained with hydrocyanic acid in an aqueous solution containing cuprous chloride, copper metal and a buffer selected from the group consisting of calcium carbonate and magnesium carbonate at a temperature between 10° and 100° C., the amount of cuprous chloride and copper metal together being 1 to 2% by weight based on 1-chloro-4-cyano-butene-2, and the amount of cuprous chloride being about twice by weight that of the copper metal.

2. The process as defined in claim 1, wherein the solvent is methyl alcohol admixed with benzene.

3. The process as defined in claim 1, wherein the solvent is ethyl alcohol admixed with benzene.

References Cited in the file of this patent

UNITED STATES PATENTS

| | | |
|---|---|---|
| 2,322,273 | Biggs | June 22, 1943 |
| 2,477,597 | Hager | Aug. 2 1949 |